(12) United States Patent
Kuehnel

(10) Patent No.: US 12,442,227 B2
(45) Date of Patent: Oct. 14, 2025

(54) DOOR LOCK FOR A VEHICLE, WITH REDUCED NOISE GENERATION

(71) Applicant: MERCEDES-BENZ GROUP AG, Stuttgart (DE)

(72) Inventor: Joachim Kuehnel, Ebersbach (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 91 days.

(21) Appl. No.: 18/570,684

(22) PCT Filed: Apr. 29, 2022

(86) PCT No.: PCT/EP2022/061566
§ 371 (c)(1),
(2) Date: Dec. 15, 2023

(87) PCT Pub. No.: WO2022/263048
PCT Pub. Date: Dec. 22, 2022

(65) Prior Publication Data
US 2024/0229522 A1    Jul. 11, 2024

(30) Foreign Application Priority Data
Jun. 18, 2021 (DE) .................... 10 2021 003 155.5

(51) Int. Cl.
*E05B 85/26* (2014.01)
*E05B 77/36* (2014.01)

(52) U.S. Cl.
CPC .............. *E05B 85/26* (2013.01); *E05B 77/36* (2013.01)

(58) Field of Classification Search
CPC .......... E05B 77/36; E05B 77/38; E05B 77/40; E05B 85/24; E05B 85/243; E05B 85/26; B60N 2/01583; B60N 2/366
See application file for complete search history.

(56) References Cited

U.S. PATENT DOCUMENTS 5,071,178 A     12/1991  Brackman et al.
7,762,605 B2 *  7/2010   Otsuka ............... B60N 2/01583
                                                     297/378.13
(Continued)

FOREIGN PATENT DOCUMENTS

DE   1553470 A1 *  8/1970  ........... E05B 85/243
DE   3927445 A1    2/1991
(Continued)

OTHER PUBLICATIONS

International Search Report and Written Opinion mailed Aug. 9, 2022 in related/corresponding International Application No. PCT/EP2022/061566.

*Primary Examiner* — Alyson M Merlino
(74) *Attorney, Agent, or Firm* — PATENT PORTFOLIO BUILDERS PLLC

(57) ABSTRACT

A door lock for a vehicle includes a rotary latch for form-fittingly holding a locking element, a blocking mechanism for blocking the rotary latch from releasing, and a wedge system having a wedge lever and a connection piece, which can be brought into a self-locking contact position in order to reduce a relative movement between the locking element and the rotary latch. The blocking mechanism contacts a circumference of an output lever via a circular-arc-shaped circumferential segment so that, when the blocking mechanism moves, the output lever is rotated by rolling on the circumferential segment. The output lever is coupled with a driving lever so that the rotation of the output lever during the opening movement of the blocking mechanism causes the driving lever to release the self-locking connection between the wedge lever and the connection piece.

9 Claims, 5 Drawing Sheets

(56) References Cited

U.S. PATENT DOCUMENTS

Figure 1:
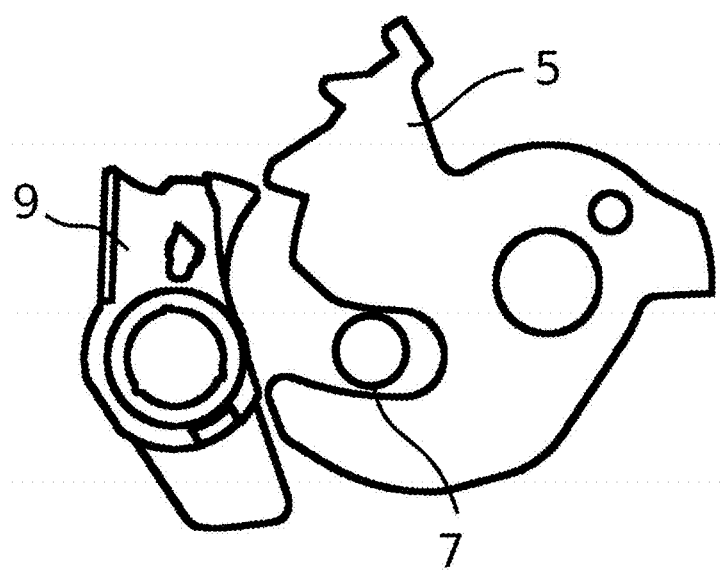

| | | | |
|---|---|---|---|
| 7,926,858 B2 * | 4/2011 | Otsuka | B60N 2/01583 |
| | | | 292/216 |
| 8,029,030 B2 * | 10/2011 | Shimura | B60N 2/01583 |
| | | | 292/216 |
| 8,511,723 B2 * | 8/2013 | Otsuka | B60N 2/01583 |
| | | | 292/216 |
| 8,950,810 B2 * | 2/2015 | Dryburgh | B60N 2/01583 |
| | | | 297/378.13 |
| 9,180,798 B2 * | 11/2015 | Suzumura | E05B 85/26 |
| 9,475,406 B2 * | 10/2016 | Mueller | B60N 2/01583 |
| 2006/0082204 A1 * | 4/2006 | Zhang | B60N 2/01583 |
| | | | 297/366 |

FOREIGN PATENT DOCUMENTS

| | | | | |
|---|---|---|---|---|
| DE | 102008010002 A1 | | 10/2009 | |
| DE | 202012011372 U1 * | | 4/2014 | E05B 77/36 |
| DE | 102017205656 A1 | | 6/2018 | |
| DE | 102018126968 A1 * | | 4/2020 | E05B 81/14 |

\* cited by examiner

DOOR LOCK FOR A VEHICLE, WITH REDUCED NOISE GENERATION

BACKGROUND AND SUMMARY OF THE INVENTION

Exemplary embodiments of the invention relate to a door lock for a vehicle, as well as a vehicle with such a door lock.

Door locks of vehicles can be a source of noise if the door lock has been designed with internal play for function reasons to ensure reliable operation of the door lock.

DE 10 2017 205 656 A1 refers to the reduction of this problem and specifies the object of providing an improved lock in order to avoid, in particular in a closed position and at low sealing pressures, the separation of the blocking surfaces of a pawl and a rotary latch due to dynamic load change reactions of the door during driving. As a solution, DE 10 2017 205 656 A1 specifies a lock, in particular for a backrest or tailgate of a motor vehicle, comprising: A rotary latch having a locking element, an assigned blocking mechanism, in particular a pawl, for blocking the rotary latch in a closed position of the lock in which the rotary latch and the locking element are coupled so as to close, and an immobilization lever coupled with the blocking mechanism, wherein the immobilization lever has an external contour holding the locking element in the closed position of the lock in the rotary latch in a self-locking manner.

The immobilization lever is thus the critical apparatus feature of DE 10 2017 205 656 A1 for solving the above-mentioned object. So that the above-mentioned blocking mechanism can perfectly engage into a protrusion of the rotary latch so that the rotary latch holds the locking element form-fittingly and stays blocked in this position, typically a protrusion of such type has some play. The rotary latch can likewise turn further because of this play, as the blocking mechanism is not in principle held, due to the above-mentioned play, on the abutment in the rotary latch in a circumferential direction of the rotary latch. The immobilization lever, however, is an element of the door lock that is arranged, for example, together with the rotary latch and the blocking mechanism in a vehicle door. This immobilization lever presses against the locking element with a self-locking clamping function in the closed state of the door lock so that any clattering of the door lock is prevented. The door lock is therefore braced with an additional element (immobilization lever) so that the mentioned play cannot perform any more movement due to the function of the immobilization lever. Thus, the above-mentioned object is solved by DE 10 2017 205 656 A1 in order to prevent in particular a clatter in the closed state, in particular of a door lock.

The self-locking clamping function of the immobilization lever can, as described in DE 10 2017 205 656 A1, for example be achieved by a rotatably mounted immobilization lever having a curve with a growing radius on its outer side at least over a certain angle range. With increasing turning of the immobilization lever into the self-locking position, a larger outer radius of the immobilization lever contacts a second portion that presses against the locking element and, for example, is arranged on the chassis. The increasing radius on this circumferential segment corresponds to a gradient. If the chosen angle of this gradient is too large in relation to a tangent on a notional circular-segment-shaped circumference with the radius of the smallest radius of this surface of the immobilization lever, the self-locking function is not guaranteed and the self-locking position of the immobilization lever could be cancelled out by mechanical stimulation (in particular the locking element pushing against it).

Furthermore, however, it should be noted that the system, like every other mechanical system, is subject to continual wear and tear and thus the turning angle of the immobilization lever will become larger with increasing age, meaning that as the wear increases, the actual operative area for the self-locking position of the immobilization lever is shifted increasingly in the direction of a last section of the circumferential segment of the immobilization lever in which a self-locking effect is still possible. From then on, the immobilization lever is maximally turned into the interior of the door lock and in addition a self-locking position is no longer possible. This occurs particularly quickly if the gradient angles are too small; however, they cannot be made arbitrarily large for the above-mentioned reason of the danger of the loss of self-locking.

Exemplary embodiments of the invention are directed to solving the above-described problem and prolonging the lifetime of the door lock, in particular by an increased lifetime of the functioning of such an immobilization lever (described in the following with the elements of the "wedge system," in particular described by the "wedge lever").

A first aspect of the invention relates to a door lock for a vehicle, comprising:
  a rotary latch for form-fittingly holding a locking element in the closed state of the door lock by engaging, in particular by rotationally engaging, around the locking element,
  a blocking mechanism, in particular a pawl, for blocking the rotary latch from releasing the form fit of the rotary latch with the locking element in the closed state of the door lock after a closing movement of the blocking mechanism,
  a wedge system comprising a wedge lever and a connection piece, wherein the wedge lever and the connection piece can perform a movement relative to each other and thus can be brought into a self-locking contact position for the closed state of the door lock in order to reduce a relative movement between the locking element and the rotary latch, characterized in that the blocking mechanism contacts a circumference of a rotatably mounted output lever via a circular arc-shaped circumferential segment in a friction-fit and/or form-fitting manner so that, during an opening movement and the closing movement of the blocking mechanism, the output lever is rotated by rolling on the circumferential segment of the blocking mechanism, wherein the output lever is coupled with a driving lever so that the rotation of the output lever during the opening movement of the blocking mechanism causes the driving lever to release the self-locking connection between the wedge lever and the connection piece.

In contrast to the above-described prior art, a geared effect between the circular-arc-shaped circumferential segment of the blocking mechanism and the output lever and its impact on the driving lever ensures that tolerances that only arise over time because of wear are compensated for. Further details of the mode of operation can be found in the exemplary embodiment described in detail in FIGS. 2 to 4. Therefore, it is an advantageous effect of the invention that the above-mentioned problem from the prior art and thus the connected compromise that is difficult to achieve, between too large and too small a gradient angle of the eccentric-like outer contour of the circumferential segment, is solved and, even in the case of wear, the wedge lever (which corresponds to the above-mentioned "immobilization lever") can be lowered sufficiently deeply in order to at least indirectly induce a clamping force on the locking element.

According to an advantageous embodiment, the driving lever, the output lever, and the wedge lever are mounted rotatably concentric to each other and are rotatable independently of each other when mounted. The driving lever, output lever, and wedge lever therefore preferably have a common kinematic rotational axis, however they are mounted, in principle so as to be able to rotate independently from each other, in a housing of the door lock.

According to a further advantageous embodiment, the output lever has a cam rotating with the output lever, wherein the cam strikes a protrusion of the driving lever during the opening movement of the blocking mechanism, and after the cam has struck the protrusion, the output lever rotates with the driving lever. The cam in particular is formed as a protrusion projecting from a round surface of the output lever. Play is preferably provided between the cam and the protrusion of the driving lever in the fully closed state of the door lock so that the wedge system is decompressed only after a certain time-delay after the initiation of the opening movement of the blocking mechanism.

According to a further advantageous embodiment, the driving lever and the wedge lever are coupled via an opening spring, wherein to release the self-locking connection between the wedge lever and the connection piece, the opening spring forces the wedge lever from the self-locking connection into an open position, by tensioning the opening spring by the driving lever, guided by the output lever, against a spring force under pressure and pushing the tensioned opening spring against the wedge lever in the direction of rotation towards the open position. The opening spring has the advantageous effect that a stuck wedge lever does not block the blocking mechanism and thus lead to the non-opening of the lock.

According to a further advantageous embodiment, the opening spring is a spiral spring guided around an arc-shaped guide of the driving lever.

According to a further advantageous embodiment, the driving lever is connected with a closing spring, wherein the closing spring is arranged and pre-tensioned in such a way that the closing spring forces the driving lever together with the wedge lever in the direction of the self-locking position. Like the opening spring, the closing spring also causes the wedge lever to re-set even in the worn state, as the spring travel, which is far more than the dimensions of the expected wear, compensates for such signs of wear.

According to a further advantageous embodiment, the connection piece is a region of the locking element. According to this embodiment, the self-locking connection between the connection piece and the wedge lever takes place directly on the locking element, as the wedge lever and locking element come into direct contact with each other and create the self-locking connection.

According to a further advantageous embodiment, the connection piece is mounted rotatably, wherein a surface that interacts with the wedge lever for forming the self-locking is arranged on a first side of the connection piece and a second side of the connection piece, opposite the first, presses against the locking element in the closed state of the door lock, by transferring a radial force of the wedge lever via the connection piece onto the locking element. The moveable mounting of the connection piece enables an ideal self-locking contact action between the wedge lever and the connection piece, wherein the connection piece furthermore serves as a spacer between the wedge lever and the locking element so that the wedge lever can be designed shorter.

According to a further advantageous embodiment, the circular-arc-shaped circumferential segment of the blocking mechanism has a spur gearing. The spur gearing is a particularly reliable means to be able to transfer higher forces between the blocking mechanism and the output lever, without disturbing the functioning by the occurrence of slippage. Advantageously, the rolling side of the output lever correspondingly has a toothed surface in which the spur gearing engages. This thereby creates a geared effect of the output lever through the circular-arc-shaped circumferential segment of the blocking mechanism, whereby a larger adjustment angle of the wedge lever is achieved.

A further aspect of the invention relates to a vehicle having a door lock, as described above and in the following, wherein the locking element is arranged on a chassis of the vehicle, wherein the rotary latch and the blocking mechanism and the wedge system and the output lever and the driving lever are arranged on a door of the vehicle.

Advantages and preferred developments of the proposed vehicle result from an analogous and logical transfer of the explanations made above in connection with the proposed door lock.

Further advantages, features and details arise from the following description in which at least one exemplary embodiment is described in detail, if applicable with reference to the drawing. The same, similar and/or functionally identical parts are referred to with the same reference numerals.

BRIEF DESCRIPTION OF THE DRAWING FIGURES

Figure 2:
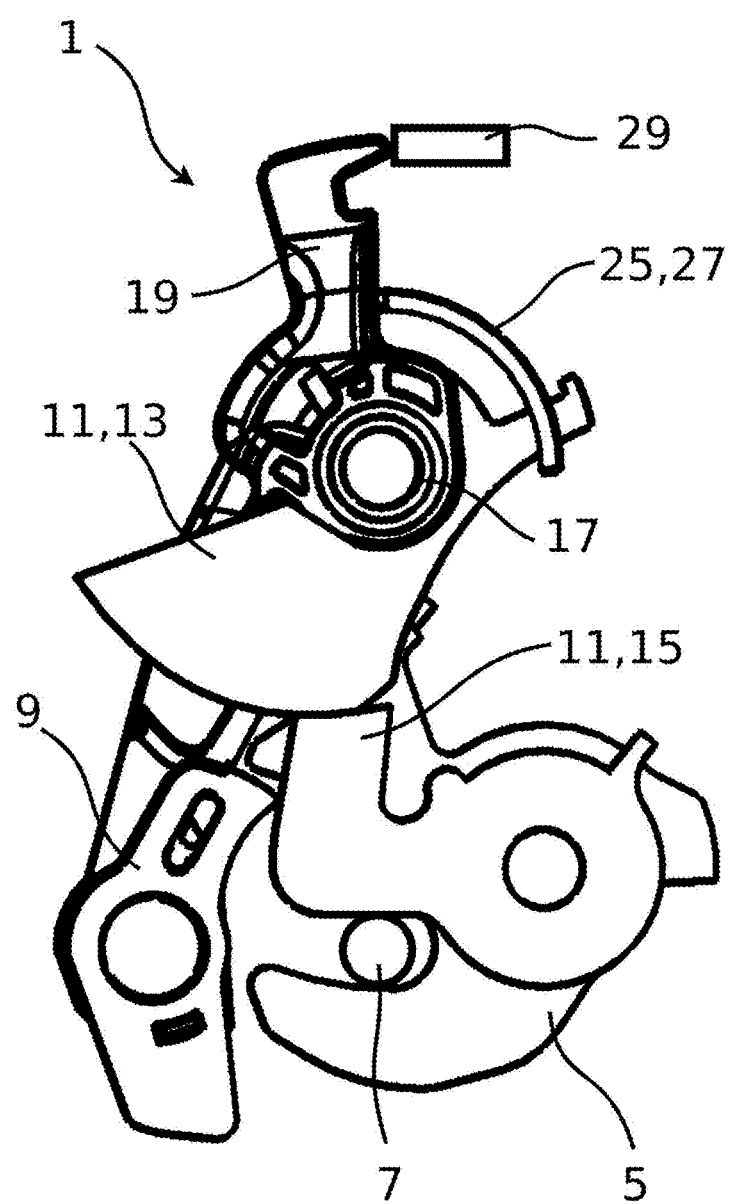
Figure 3:
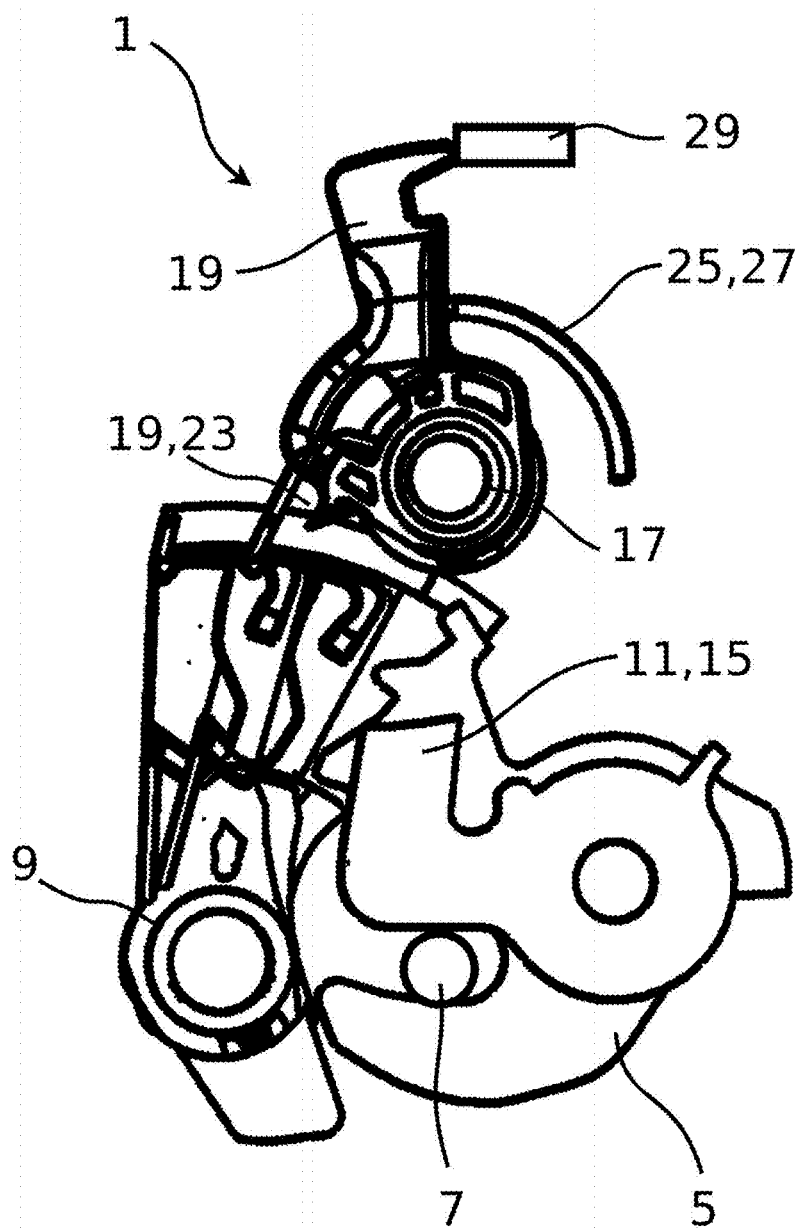
Figure 4:
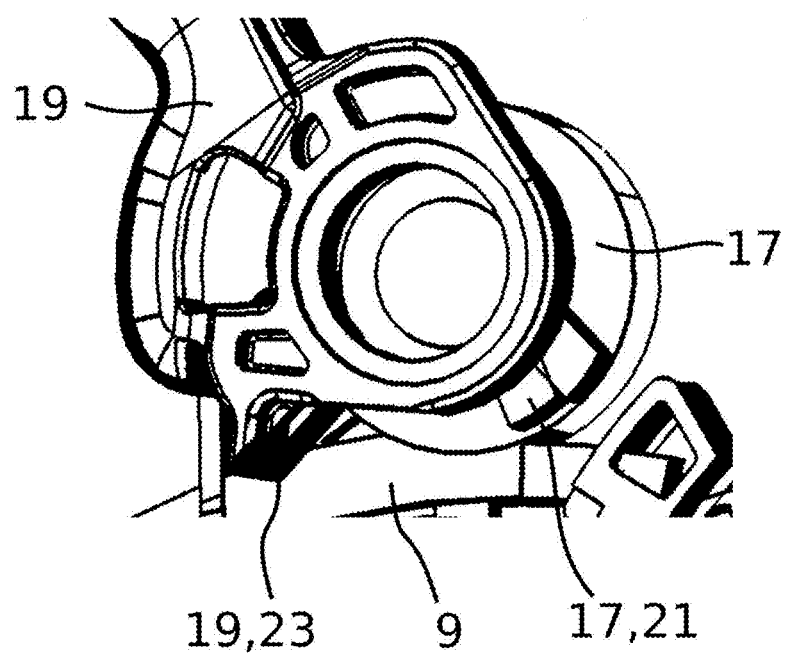
Figure 5:
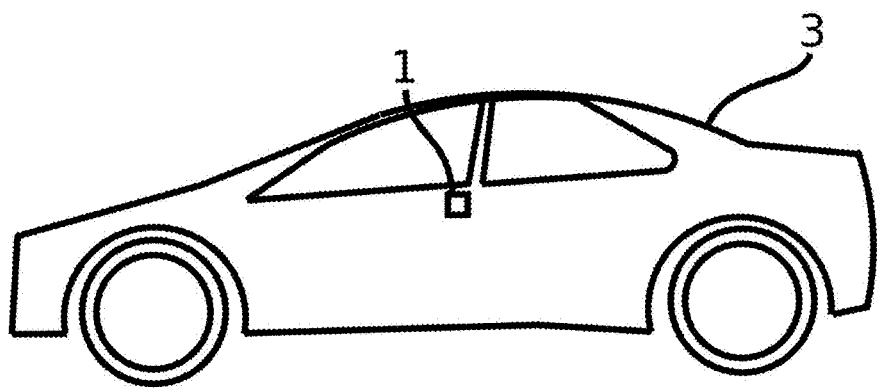

Here are shown:

FIG. 1: Parts of a door lock from the prior art.
FIG. 2: A door lock according to an exemplary embodiment of the invention.
FIG. 3: The door lock from FIG. 2 in a sectional view.
FIG. 4: Parts of the door lock from FIG. 2 enlarged in a sectional view.
FIG. 5: A vehicle having a door lock according to an exemplary embodiment of the invention.

The illustrations in the figures are schematic and are not to scale.

DETAILED DESCRIPTION

FIG. 1 illustrates a partial section of a door lock 1 (see following figures). A rotary latch 5 serves to hold a locking element 7 form-fittingly in order to hold the door closed in a closed state of the door lock 1. As soon as the rotary latch 5 engages around the locking element 7, a blocking mechanism 9 falls into a protrusion of the rotary latch 5 in order to protect this against unscrewing and releasing. Thus, the rotary latch 5 stays blocked in the position engaging around the locking element 7. So that the blocking mechanism 9 can fall into the protrusion of the rotary latch 5, the rotary latch 5 must rotate so far in the clockwise direction until there is a gap with play between the edge defining the protrusion of the rotary latch 5 and the angular projection of the blocking mechanism 9. This play also manifests itself in the distance between the locking element 7 and the cove-shaped concave protrusion of the rotary latch 5. This play is also known as over travel and therefore can lead to the door lock 1 generating clattering noises when it is stimulated during driving. FIGS. 2 to 4 below therefore show a solution to prevent this problem by additionally clamping the locking element 7 by a wedge lever 13, wherein the wear of the wedge lever 13 and other components is taken into account.

FIG. 2 illustrates a door lock 1 for a vehicle 3, as shown in FIG. 5. The door lock 1 has a rotary latch 5 for form-fittingly holding a locking element 7 in the closed state of the door lock 1 by rotary engagement around it, and a blocking mechanism 9, formed here as a pawl, for blocking the rotary latch 5 from releasing the form-fit of the rotary latch 5 with the locking element 7 after a closing movement of the blocking mechanism 9. Additionally, the door lock 1 has a wedge system 11 with a wedge lever 13 and a connection piece 15. The wedge lever 13 and the connection piece 15 are moveably mounted in such a way that they can carry out a movement relative to each other and thus are brought into a self-locking contact position for the closed state of the door lock 1, as shown in FIG. 2. The wedge lever 13 can be rotated in the clockwise direction into an open position, in the view of FIG. 2. The wedge lever 13 in the self-locking position presses against the rotatably mounted connection piece 15 which in turn presses against the locking element 7 in order to reduce a relative movement between the locking element 7 and the rotary latch 5. The blocking mechanism 9 contacts a circumference of a rotatably mounted output lever 17 via a circular-arc-shaped circumferential segment on its end side by means of spur gearing so that, during an opening movement and closing movement of the blocking mechanism 9, the output lever 17 is rotated by rolling on the circumferential segment of the blocking mechanism 9, wherein the output lever 17 is coupled with a driving lever 19 so that the rotation of the output lever 17 during the opening movement of the blocking mechanism 9 causes the driving lever 19 to release the self-locking connection between the wedge lever 13 and the connection piece 15. The driving lever 19, the output lever 17 and the wedge lever 13 are all mounted rotatably concentric to each other and in principle are rotatable independently from each other when mounted. The driving lever 19 and the wedge lever 13, however, are coupled via an opening spring 25. To release the self-locking connection between the wedge lever 13 and the connection piece 15, the opening spring 25 tends to force the wedge lever 13 from the self-locking position into an open position, when the driving lever 19 sufficiently compresses the opening spring 25. The opening spring 25 is not separately shown in FIG. 2, rather only the arc-shaped guide 27 of the driving lever 19 around which the opening spring 25 formed as a spiral spring is guided. The opening spring 25 is then compressed by the driving lever 19 when a cam 21 rotating with the output lever 17 encounters a projection 23 of the driving lever 19 and thus is rotated with the driving lever 19. The driving lever 19 then compresses the opening spring 25 together and presses against the wedge lever 13 with its spring force. A closing spring 29, which presses against the driving lever 19, causes the driving lever 19 together with the wedge lever 13 to travel in the direction of the self-locking position during the closing of the door lock 1.

The opening process of the door lock 1 can be described as follows: The blocking mechanism 9 is designed as a pawl and the locking element 7 is designed as a locking clamp. The circular-arc-shaped circumferential segment of the pawl 9 is designed as a spur gearing in order to rotate the circumferential segment of the rotatably mounted output lever 17 with each movement of the pawl 9, whether that be an opening movement or a closing movement of the pawl 9. For this purpose, the output lever 17 is mounted rotatably in the door lock 1 so that the output lever 17 rotates when driven by the spur gearing of the pawl 9. If the pawl 9 is moved out of the closed state of the door lock 1 in an opening movement of the rotary latch 5 to release the rotary latch 5 so that the rotary latch 5 is not engaging around the locking clamp 7 anymore, the output lever 17 is rotated based on the movement of the spur gearing of the pawl 9 until a cam 21 arranged on the output lever 17 comes into contact with a projection of the driving lever 19. The driving lever 19, the output lever 17, and the wedge lever 13 are all concentrically mounted and can rotate independently of each other about the same kinematic axis. If, as explained above, the cam 21 of the output lever 17 hits the projection of the driving lever 19, the driving lever 19 also rotates because of the rotational movement of the output lever 17. As the driving lever 19 is coupled with an opening spring 25 on an upper side of the wedge lever 13, the opening spring 25 is pressed together between the wedge lever 13 and the driving lever 19 by this rotational movement of the driving lever 19, whereby the expanding force of the opening spring 25 impacts on this upper side of the wedge lever 13 and therefore forces the opposite side of the wedge lever 13, meaning the side of the wedge lever 13 contacting the connection piece 15, out of the self-locking position, meaning to angles of rotation of the wedge lever 13 at which smaller radii of the wedge lever 13 occur in the region of the connection piece 15, so that the self-locking connection between the wedge lever 13 and the connection piece 15 is released. The opening spring 25 balances out the play and shape changes so that the functioning of the mechanism is not affected, independently of the signs of wear of the wedge lever 13. If the friction of the self-locking connection is overpowered, the opening spring 25 relaxes until the wedge lever 13 encounters an abutment of the driving lever 19. Then the self-locking effect between the wedge lever 13 and the connection piece 15 is fully removed, the wedge lever 13 does not have an effect on the connection piece 15 any longer and the connection piece 15 does not press on the locking clamp 7 anymore so that the locking clamp 7 is located, with play due to its design, in the rotary latch 5 which, however, likewise does not engage around the locking clamp 7 any longer when the pawl 9 is sufficiently open. In this final state, the door lock 1 is opened and neither the connection piece 15 nor the rotary latch 5 contact the locking clamp 7 so that the door is no longer held by the locking clamp 7 by the form-fit engagement in the door lock 1 and can be opened.

During the closing process of the door lock 1, the pawl 9 carries out the opposite movement to the one described above, after the rotary latch 5 has engaged around the locking clamp 7 so that the locking clamp 7 is form-fittingly held by the rotary latch 5 engaging around it. The rotary latch 5, held by the pawl 9, cannot rotate anymore in such a way that it cannot engage around the locking clamp 7 anymore—this secures the rotary latch 5 in its position engaging around the locking clamp 7. During the closing movement of the pawl 9, however, the output lever 17 is again driven by the spur gearing of the pawl 9—and rotated—only in the opposite direction of rotation to the opening movement of the door lock 1 described above. The cam 21 of the output lever 17 moves away from the projection 23 of the driving lever 19 so that the driving lever 19 can also somewhat follow the movement of the cam 21, driven by the expanding force of the closing spring 29. In order to ensure that the wedge lever 13 is moved over the connection piece 15 so that self-locking friction occurs between the wedge lever 13 and the connection piece 15, which is made possible by the eccentric surface design of the wedge lever 13 with the above-described gradient (of the increasing radius over a circumference), a closing spring 29 is arranged on an upper side of the driving lever 19, which presses on the driving lever 19 and ensures that the wedge lever 13 is always forced into the self-locking position, independently of how much wear has already occurred on the wedge lever 13, in particular its surface coming into contact with the connection piece 15, and on the other components of the door lock 1.

In particular, the functioning of the output lever 17, and thus also of the closing spring 29, as well as the opening spring 25 ensure that the lifetime of the door lock 1 is increased, as for example both springs secure their mechanism of action independently of any wear and changed play, lengths, necessary angles or similar are balanced out by their movement.

FIG. 3 illustrates the door lock 1 of FIG. 2, however with the wedge lever 13 intentionally removed in order to illustrate the functioning and the interaction in particular between the blocking mechanism 9 and the output lever 17. The output lever 17 rolls during a movement of the blocking mechanism 9 on the circumferential segment thereof which is located on the upper end of the blocking mechanism 9 in FIG. 3. For improved clarity of the movement of the blocking mechanism 9, the latter is shown in FIG. 3 in multiple positions via an opening movement. Its spur gearing takes the output lever 17 on its circumference so that the output lever 17, mounted in a housing of the door lock 1, rotates like a wheel.

FIG. 4 illustrates an enlarged section of FIGS. 2 and 3, comprising in particular the output lever 17. The output lever 17 is rotated by an opening movement or closing movement of the blocking mechanism 9 in which a spur gearing, arranged on the upper side, of the blocking mechanism 9 imitates the movement of a wheel, at least over a certain angle range, and thus moves with the circular circumference of the output lever 17 so that the output lever 17 rolls on the circumferential segment of the blocking mechanism 9. A cam 21, which is arranged in the region of a circumferential side of the output lever 17, impinges on a projection 23 of the driving lever 19 at a sufficient rotational angle of the output lever 17. The cam 21 pushes the projection 23 which in turn is fixedly arranged on the driving lever 19. Thus, the driving lever 19 also rotates.

FIG. 5 illustrates a vehicle 3 with a door lock 1 according to FIGS. 2 to 4. The locking element 7 is arranged on a chassis of the vehicle 3. The rotary latch 5 and the blocking mechanism 9 and the wedge system 11 and the output lever 17 and the driving lever 19 are, by contrast, all arranged on a door of the vehicle 3.

Although the invention has been illustrated and explained in detail by preferred exemplary embodiments, the invention is not restricted by the disclosed examples and other variations may be derived therefrom by the person skilled in the art without leaving the scope of the invention. It is therefore clear that there is a plurality of possible variations. It is also clear that embodiments stated by way of example are only really examples which are not to be seen as limiting the scope of protection, application possibilities or the configuration of the invention in any way. In fact, the preceding description and the description of the figures enable the person skilled in the art to implement the exemplary embodiments in a concrete manner, wherein the person skilled in the art with the knowledge of the disclosed inventive concepts can make various changes, for example, with regard to the functioning or arrangement of individual elements stated in an exemplary embodiment, without leaving the scope of protection which is defined by the claims and their legal equivalents, such as further explanations in the description.

The invention claimed is:

1. A door lock for a vehicle, the door lock comprising:
   a locking element;
   a rotary latch configured to form-fittingly hold the locking element in a closed state of the door lock by rotationally engaging around the locking element;
   a pawl configured to block the rotary latch from releasing the form-fittingly holding of the locking element in the closed state of the door lock after a closing movement of the pawl;
   a wedge system comprising a wedge lever and a connection piece, wherein the wedge lever and the connection piece are configured to perform a movement relative to each other so that the wedge lever and the connection piece are brought into a self-locking contact position to form a self-locking connection for the closed state of the door lock to reduce a relative movement between the locking element and the rotary latch;
   a rotatably mounted output lever, wherein spur gearing on a circular-arc-shaped circumferential segment of the pawl contacts a circumference of the rotatably mounted output lever so that, during an opening movement and the closing movement of the pawl, the output lever is rotated by rolling on the circular-arc-shaped circumferential segment of the pawl via the spur gearing; and
   a driving lever coupled with the rotatably mounted output lever so that rotation of the output lever during the opening movement of the pawl causes the driving lever to release the self-locking connection between the wedge lever and the connection piece.

2. The door lock of claim 1, wherein the driving lever, the output lever, and the wedge lever are mounted rotatably concentric to each other and are rotatable independently of each other when mounted.

3. The door lock of claim 1, wherein the output lever has a cam rotating with the output lever, wherein the cam strikes a protrusion of the driving lever during the opening movement of the pawl, and after the cam has struck the protrusion, the output lever rotates with the driving lever.

4. The door lock of claim 1, wherein the driving lever and the wedge lever are coupled via an opening spring, wherein to release the self-locking connection between the wedge lever and the connection piece, the opening spring forces the wedge lever from the self-locking connection into an open position, by tensioning the opening spring by the driving lever, guided by the output lever, against a spring force under pressure and pushing the opening spring against the wedge lever in a direction of rotation towards the open position.

5. The door lock of claim 4, wherein the opening spring is a spiral spring guided around an arc-shaped guide of the driving lever.

6. The door lock of claim 1, wherein the driving lever is connected with a closing spring, wherein the closing spring is arranged and pre-tensioned in such a way that the closing spring forces the driving lever together with the wedge lever in a direction of the self-locking contact position.

7. The door lock of claim 1, wherein the connection piece is a region of the locking element.

8. The door lock of claim 1, wherein the connection piece is mounted rotatably, wherein a surface that interacts with the wedge lever for forming the self-locking is arranged on a first side of the connection piece and a second side of the connection piece, opposite the first side, presses against the locking element in the closed state of the door lock, by transferring a radial force of the wedge lever via the connection piece onto the locking element.

9. A vehicle comprising:
   a chassis;
   a door; and
   a door lock, which comprises
      a locking element;
      a rotary latch configured to form-fittingly hold the locking element in a closed state of the door lock by rotationally engaging around the locking element;
      a pawl configured to block the rotary latch from releasing the form-fittingly holding of the rotary latch with the locking element in the closed state of the door lock after a closing movement of the pawl;
      a wedge system comprising a wedge lever and a connection piece, wherein the wedge lever and the connection piece are configured to perform a movement relative to each other so that the wedge lever and the connection piece are brought into a self-locking contact position to form a self-locking connection for the closed state of the door lock to reduce a relative movement between the locking element and the rotary latch;
      a rotatably mounted output lever, wherein spur gearing on a circular-arc-shaped circumferential segment of the pawl contacts a circumference of the rotatably mounted output lever so that, during an opening movement and the closing movement of the pawl, the output lever is rotated by rolling on the circular-arc-shaped circumferential segment of the pawl via the spur gearing; and
      a driving lever coupled with the rotatably mounted output lever so that rotation of the output lever during the opening movement of the pawl causes the driving lever to release the self-locking connection between the wedge lever and the connection piece,
   wherein the locking element is arranged on the chassis, and
   wherein the rotary latch, the pawl, the wedge system, the output lever, and the driving lever are arranged on a door of the vehicle.

* * * * *